Patented May 23, 1939

2,159,528

UNITED STATES PATENT OFFICE 2,159,528

CATALYTIC OXIDATION OF NITROSYL CHLORIDE AND NITRIC OXIDE

William C. Klingelhoefer, Jr., Syracuse, N. Y., assignor to The Solvay Process Company, New York, N. Y., a corporation of New York No Drawing. Application February 10, 1937, Serial No. 125,139

21 Claims. (Cl. 23—157)

In the oxidation of nitrosyl chloride according to the reaction (1) $\quad 2NOCl + O_2 \rightarrow 2NO_2 + Cl_2$ it has been recognized the reaction may be effected in two stages according to the equations (2) $\quad 2NOCl \rightarrow 2NO + Cl_2$
(3) $\quad 2NO + O_2 \rightarrow 2NO_2$ In order for the nitrosyl chloride to be largely decomposed, reaction (2) must be carried out at a high temperature due to the cumulative effect of adverse equilibrium conditions and low rate of reaction at low temperatures, the equilibrium being so adverse that below about 100° C. the per cent decomposition of nitrosyl chloride is negligible. At high temperatures only a small portion of the nitric oxide reacts with oxygen to form nitrogen peroxide, also due to adverse equilibrium conditions. At temperatures above about 500° C., only a negligible percentage of the nitric oxide present would be oxidized.

When it is endeavored to carry out reaction (1) (involving both reactions (2) and (3)) at low temperatures, the adverse equilibrium conditions for reaction (2) and the low rate of reaction (3) result in a relatively slow and incomplete oxidation of the nitrosyl chloride. It has been proposed, therefore, to effect the oxidation of nitrosyl chloride in two stages, by first heating nitrosyl chloride to a high temperature to cause reaction (2) to occur, and second, cooling the reaction products and adding oxygen to cause reaction (3) to occur at the lower temperature. In such a process the heat evolved by reaction (3) is at a low temperature and hence is not available as a source of heat for endothermic reaction (2) at the high temperature employed. This necessitates supplying high temperature heat required by reaction (2) from an external source. Furthermore, although reaction (3) will eventually go practicably to completion at the low temperatures employed in the second step, the rate of reaction is relatively low.

It is an object of this invention to provide a material which will simultaneously catalyze both reactions (2) and (3) so that at the lower temperatures reaction (3) will take place rapidly at substantially the same time as reaction (2) is occurring, whereby the heat evolved by reaction (3) will be available for reaction (2), which is likewise speeded up at the lower temperatures by the catalyst.

A further object of the invention, accomplished by employing catalysts of this invention, is that, at the relatively low temperatures employed, oxidation of the nitric oxide with oxygen removes one of the products of decomposition of the nitrosyl chloride, thereby reducing the effect of the adverse equilibrium conditions for reaction (2) at the low temperatures on the progress of that reaction.

The invention, therefore, will be seen to relate to catalysis of both reactions (2) and (3) by means of materials which I have discovered are active catalysts for both reactions. The invention includes, moreover, not only the simultaneous catalysis of both reactions, but also the catalysis of each of the reactions by the materials found active by me for these purposes and the catalysts therefor may be used to speed up either reaction in a process where both reactions are not simultaneously carried out. For example, a nitrosyl chloride gas may be passed into contact with catalysts in the absence of oxygen where it is desired to catalyze the decomposition of the nitrosyl chloride without oxidation of the nitric oxide. Similarly, a gas containing nitric oxide and oxygen may be passed into contact with the catalyst where it is desired to accelerate the reaction of nitric oxide and oxygen to form nitrogen peroxide.

Other objects and advantages will be apparent from the following description of the invention:

According to the present invention, a gas mixture containing nitrosyl chloride and oxygen is passed into contact with an aluminum zeolite material, for instance, a hydrated calcium aluminum silicate. A high proportion of the nitrosyl chloride is thereby oxidized through decomposition of the nitrosyl chloride to nitric oxide and chlorine and oxidation of the nitric oxide thereby produced to nitrogen peroxide, both of which reactions are catalyzed by these materials. The heat evolved by the oxidation of the nitric oxide supplies in part or in whole the heat required for the decomposition of the nitrosyl chloride.

As above indicated, the decomposition of the nitrosyl chloride is catalyzed by contact with the aluminum zeolite materials employed according to the invention. Accordingly, the gas passed into contact with the zeolite may be free of oxygen. It has been found such catalysts actively promote the decomposition of the nitrosyl chloride. As this reaction is endothermic, heat from a suitable source is supplied to support the reaction, such as by a heater in the catalyst bed or by preheating the gases.

Nitrosyl chloride, either with or without oxygen, preferably is contacted with the catalyst at a temperature between about 200° C. and about 400° C., and is preferably dry, e. g. contains less than 5% water vapor as it is passed into contact with the catalyst.

As indicated above, the catalysts employed according to this invention actively catalyze the oxidation of nitric oxide to nitrogen peroxide. Therefore, in accordance with another aspect of my invention, a gas containing nitric oxide and oxygen is passed into contact with an aluminum zeolite material. The gas is preferably contacted with the zeolite at a temperature of about 300° C. or lower and preferably contains not more than about 5% water vapor. When the gas contains a considerable proportion of water vapor, for example about 5%, it is contacted with the catalyst at a temperature preferably of about 200° C. to about 300° C.

Various aluminum zeolites, both natural and artificial, including chabazite, green sand, heulandite, stilbite, "doucil," "calcium doucil," "sodium permutit" and "vanadium permutit" have been tried and found to catalyze both the decomposition of nitrosyl chloride and the oxidation of the nitric oxide. Of these zeolites, chabazite is the preferred catalyst due to its exceptionally high activity.

Crude chabazite mineral occurs naturally in Nova Scotia and New South Wales. To prepare the mineral for use, the chabazite crystals are separated from the bulk of foreign material present, and the particle size of the crystals is reduced to about 0.05 inch in diameter. If desired, the material may be dried by heating it in a current of dry air to a temperature of about 300° C. or higher.

In order that my invention may be more clearly understood, the following examples, typical of preferred methods of procedure, are given by way of illustration:

Example 1.—A dry gas containing 40% nitrosyl chloride, 40% chlorine and 20% oxygen by volume is passed into contact with chabazite at a temperature of 250° C., atmospheric pressure and space velocity of about 200. (The space velocities given herein are based on the total volume of gas, at standard temperature and pressure, passed into contact with the catalyst, and is equal to the volume of this gas per unit apparent volume of catalyst per hour.)

Example 2.—A gas containing equi-molecular proportions of nitrosyl chloride and chlorine is passed in contact with chabazite at a temperature of 250° C., at atmospheric pressure and space velocity of about 200.

Example 3.—A gas containing 10% nitric oxide and 90% air is passed in contact with chabazite at a temperature of 200° C., atmospheric pressure and a space velocity of 1000.

The above examples are given by way of example only and not as limiting the scope of the invention defined by the claims hereunder.

The objects of the present invention are obtained by the processes described regardless of the pressure and space velocity at which the processes are performed. Thus although the rates of decomposition and oxidation are greater at high pressure than at low pressure, both reactions are catalyzed by the described materials so that when they are used lower pressures and/or higher space velocities may be employed.

The present application is in part a continuation of the copending application Serial No. 697,241, filed November 9, 1933, by Herman A. Beekhuis, Jr., and myself.

I claim:
1. In a process for the decomposition of nitrosyl chloride to nitric oxide and chlorine, the improvement which comprises passing said nitrosyl chloride into contact with a catalyst comprising an aluminum zeolite.

2. In a process for the decomposition of nitrosyl chloride to nitric oxide and chlorine, the improvement which comprises passing said nitrosyl chloride into contact with a catalyst comprising an aluminum zeolite at a temperature between about 200° C. and about 400° C.

3. In a process for the decomposition of nitrosyl chloride to nitric oxide and chlorine the improvement which comprises passing said nitrosyl chloride into contact with a catalyst comprising chabazite.

4. In a process for the decomposition of nitrosyl chloride to nitric oxide and chlorine the improvement which comprises passing said nitrosyl chloride into contact with a catalyst comprising chabazite at a temperature between about 200° C. and about 400° C.

5. In a process for the oxidation of nitrosyl chloride to nitrogen peroxide and chlorine the improvement which comprises passing said nitrosyl chloride with oxygen into contact with a catalyst comprising an aluminum zeolite.

6. In a process for the oxidation of nitrosyl chloride to nitrogen peroxide and chlorine the improvement which comprises passing said nitrosyl chloride with oxygen into contact with a catalyst comprising an aluminum zeolite at a temperature between about 200 C. and about 400° C.

7. In a process for the oxidation of nitrosyl chloride to nitrogen peroxide and chlorine the improvement which comprises passing said nitrosyl chloride with oxygen into contact with a catalyst comprising a calcium-aluminum silicate at a temperature between about 200° C. and about 400° C.

8. In a process for the oxidation of nitrosyl chloride to nitrogen peroxide and chlorine the improvement which comprises passing said nitrosyl chloride with oxygen into contact with chabazite.

9. In a process for the oxidation of nitrosyl chloride to nitrogen peroxide and chlorine the improvement which comprises passing said nitrosyl chloride with oxygen into contact with a catalyst comprising chabazite at a temperature between about 200° C. and about 400° C.

10. In a process for the treatment of a gas containing nitrosyl chloride to oxidize the nitrosyl chloride to form nitrogen peroxide and chlorine the improvement which comprises passing a mixture containing said gas and oxygen and containing not more than about 5% water vapor into contact with a catalyst comprising an aluminum zeolite.

11. In a process for the oxidation of nitric oxide to nitrogen peroxide the improvement which comprises passing said nitric oxide with oxygen into contact with a catalyst comprising an aluminum zeolite.

12. In a process for the oxidation of nitric oxide to nitrogen peroxide the improvement which comprises passing said nitric oxide with oxygen into contact with a catalyst comprising an aluminum zeolite at a temperature below about 300° C.

13. In a process for the oxidation of nitric oxide to nitrogen peroxide the improvement which comprises passing said nitric oxide with oxygen into contact with a catalyst comprising chabazite.

14. In a process for the oxidation of nitric oxide to nitrogen peroxide the improvement which comprises passing nitric oxide with oxygen into contact with a catalyst comprising chabazite at a temperature below about 300° C.

15. In a process for the treatment of a gas containing nitric oxide to oxidize the nitric oxide to form nitrogen peroxide the improvement which comprises passing a mixture containing said gas and oxygen and containing not more than about 5% water vapor into contact with a catalyst comprising an aluminum zeolite at a temperature between about 200° C. and about 300° C.

16. In a process for the decomposition of nitrosyl chloride to nitric oxide and chlorine, the improvement which comprises passing said nitrosyl chloride into contact with a catalyst comprising a calcium-aluminum silicate.

17. In a process for the oxidation of nitric oxide to nitrogen peroxide, the improvement which comprises passing said nitric oxide with oxygen into contact with a catalyst comprising a calcium-aluminum silicate.

18. In a process for the oxidation of nitric oxide to nitrogen peroxide, the improvement which comprises passing said nitric oxide with oxygen into contact with a catalyst comprising an aluminum zeolite at a temperature of about 200° C.

19. In a process for the decomposition of nitrosyl chloride to nitric oxide and chlorine, the improvement which comprises passing said nitrosyl chloride into contact with a catalyst comprising an aluminum zeolite at a temperature above 100° C.

20. In a process for the oxidation of nitrosyl chloride to nitrogen peroxide and chlorine, the improvement which comprises passing said nitrosyl chloride with oxygen into contact with a catalyst comprising an aluminum zeolite at a temperature between about 100° C. and about 500° C.

21. In a process for the oxidation of nitric oxide to nitrogen peroxide, the improvement which comprises passing said nitric oxide with oxygen into contact with a catalyst comprising an aluminum zeolite at a temperature between about 100° C. and about 500° C.

WILLIAM C. KLINGELHOEFER, Jr.